(12) United States Patent
Aull

(10) Patent No.: US 6,898,710 B1
(45) Date of Patent: May 24, 2005

(54) SYSTEM AND METHOD FOR SECURE LEGACY ENCLAVES IN A PUBLIC KEY INFRASTRUCTURE

(75) Inventor: Kenneth W. Aull, Fairfax, VA (US)

(73) Assignee: Northop Grumman Corporation, Los Angeles, CA (US)

( * ) Notice: Subject to any disclaimer, the term of this patent is extended or adjusted under 35 U.S.C. 154(b) by 895 days.

(21) Appl. No.: 09/730,044

(22) Filed: Dec. 5, 2000

Related U.S. Application Data

(60) Provisional application No. 60/229,336, filed on Sep. 1, 2000, and provisional application No. 60/210,521, filed on Jun. 9, 2000.

(51) Int. Cl.[7] .............................................. G06F 1/24
(52) U.S. Cl. ...................... 713/182; 713/189; 713/200; 713/201
(58) Field of Search ................................ 713/182, 189, 713/200, 201

(56) References Cited

U.S. PATENT DOCUMENTS 6,026,379 A * 2/2000 Haller et al. .................. 705/34

OTHER PUBLICATIONS

Frank P. Coyle, "Legacy Integration–Changing Perspectives", IEEE Software, Apr. 17, 2000, p. 37–41, No. 2, vol. 17.

Masanobu Hamano, et al., "The Remote Window System", research paper 5 for the 42nd Information Processing Academic Conference held by Japan Information Processing Association, Feb. 2, 1991, p. 295–301.

* cited by examiner

Primary Examiner—Thomas R. Peeso
(74) Attorney, Agent, or Firm—Tarolli, Sundheim, Covell & Tummino L.L.P.

(57) ABSTRACT

System and method for secure legacy enclaves in a Public Key Infrastructure that includes one or more legacy servers, client platforms, directories, and a Virtual Private Network extranet gateway. The servers contain one or more legacy applications and are connected to a first network. The client plafforms are connected to a second network and contain legacy software employable by users to access the legacy applications. The directories are connected to the second network and contain information on user authorization to access the servers. The gateway is connected between the servers and the second network. The gateway requests a signature certificate of each user attempting access to a legacy application; queries the directory to confirm the user is allowed access to the server after authenticating the user; and establishes a connection between the legacy software and the legacy application if the user is allowed access to the server.

11 Claims, 3 Drawing Sheets

SYSTEM AND METHOD FOR SECURE LEGACY ENCLAVES IN A PUBLIC KEY INFRASTRUCTURE

CROSS REFERENCE TO RELATED APPLICATIONS

This application claims the benefit of U.S. Provisional Application No. 60/210,521 filed on Jun. 9, 2000, and U.S. Provisional Application No. 60/229,336 filed on Sep. 1, 2000, the contents of which are expressly incorporated by reference herein.

BACKGROUND

1. Field of the Invention

This invention relates to Public Key Infrastructures (PKI), and more specifically to secure legacy enclaves in a PKI.

2. Background Information

A public key infrastructure (PKI) is a collection of servers and software that enables an organization, company, or enterprise to distribute and manage thousands of unique public/private cryptographic keys in a manner that allows users to reliably determine the identity of the owner of each public/private key pair. When each member of an enterprise has a unique key, paper-based business processes may be transitioned to an online, electronic equivalent. Public/private key pairs have the property that for any given public key there exists one and only one private key, and vice versa. Public key cryptography (i.e., the ability to publicly distribute the encryption key) can be used to digitally sign documents. If a particular message can be decrypted using one member of the key pair, then the assumption is that the message must have been encrypted using the other member. If only one person knows the key used to perform the encryption of a document in the first place, then the recipients that can decrypt the document can be sure that the sender of the document must be that person.

However, for a digital signature to be meaningful, the recipient of an object signed with the digital signature must first be able to reliably determine the owner and integrity of the key used to sign the object. Public infrastructures accomplish this using an electronic document called a digital certificate. Certificates may contain information identifying the owner of the key pair, the public component of the pair, and the period of time for which the certificate is valid. The certificate may also identify technical information about the key itself, such as the algorithm used to generate the key, and the key length. Certificates are generated by organizations, companies, or enterprises that are responsible for verifying the identity of individuals (or in some instances organizations) to which certificates are issued. The certifying organization is known as a certificate authority. The certificate authority signs each certificate using a private key known only to the certificate authority itself. This allows users of the PKI to verify both the integrity of the certificate and the identity of the authority that issued it. By issuing a certificate, a certificate authority is stating that it has verified that the public key that appears in the certificate (and, by extension, the corresponding private key) belongs to the individual listed in the certificate. The integrity with which the registration process operates is, therefore, of great importance. The process must provide mechanisms for reliably identifying the individual and for verifying that the public key listed in the certificate belongs to that individual.

FIG. 1 shows a block diagram of an example PKI system architecture. Current PKIs that provide strong authentication of user identity accomplish this via the use of a local registration authority officer (LRAO) 12. LRAO 12 operates at a work station or server platform 14 that runs a local registration authority software application 16. Server platform 14 may be any known computing device that may serve as a server, e.g., computer, workstation, etc. The local registration authority application 16 interfaces to other server platforms that may contain applications such as a certificate authority application 18, a registration authority application 20, and/or a key recovery authority application 22. Each application may be on the same server platform, or on separate individual server platforms 14. A user 10, that is using or desires access to the PKI system architecture, accesses the system via a web browser 22 on a client platform 24. A hardware token 26, such as a smart card, may also be operably connectable to client platform 24. Typically in current systems, user 10 presents a photo I.D. to the local registration authority officer 12 in order to authenticate the user's identity. Local registration authority officer 12 then uses workstation 14 and local registration authority application 16 to signal a registration authority application 20 to register new user 10 in the system. Local registration authority application 16 may be off-the-shelf product software that comes typically bundled with a certificate authority application 18, registration authority application 20, and key recovery authority 22 software.

A public/private key pair is generated by either the local registration authority application 16 or the registration authority application 20 (depending on products chosen and depending on how they've been configured). The public key is sent to certificate authority application 18 to be signed, thereby, generating a certificate for new user 10. A backup copy of the private key may also be sent to key recovery authority application 22, however, normally the private key is kept on a token 26, or at client platform 24 by user 10. Once the public key is sent to a certificate authority 18 and signed, a user certificate is generated and provided to a local registration authority server. Local registration authority officer 12 copies the certificate (including the private key) onto a floppy disk, hardware token, or other storage medium, and then provides the certificate and private key to the user.

Current PKI systems that integrate legacy applications into the system modify software in a legacy application 30 resident on a legacy server 32. The modifications are performed by a legacy developer 34 who modifies the software within the legacy application by modifying the source code and recompiling the application. The software modifications allow the legacy application to work with signature certificates. Modifying the software within the legacy application is usually very expensive.

In current systems a user may attempt to access a legacy application 30 on legacy server 32 from a client's platform 24. Before access to the legacy server is granted, the user must present the user's signature certificate to the legacy application (since the legacy application has been modified so that a certificate from the user is required). Depending on an access control list configured in the legacy application, the legacy application will either grant or deny access to the user based on the user's signature certificate. Legacy applications and servers typically employ proprietary computer interfaces and custom software clients. These interfaces and clients typically rely on a simple user ID and password scheme to authenticate the identity of a user. However, as noted previously, making significant modifications to these interfaces and clients to work with signature certificates is generally very expensive.

Therefore, a need exists for a system and method for integrating legacy systems into a modern PKI-based authentication system without requiring expensive modifications to the legacy software.

SUMMARY

The present invention is directed to a system for secure legacy enclaves in a Public Key Infrastructure (PKI) that includes one or more legacy servers, one or more client platforms, one or more directories, and a Virtual Private Network (VPN) extranet gateway. The legacy servers contain one or more legacy applications and may be connected to a first network. The client platforms are connected to a second network. The client platforms contain legacy client software employable by users to access the legacy applications. The directories are connected to the second network and contain information on the users. The directories also contain information on each user designating whether the user is authorized to access the legacy servers. The VPN extranet gateway is connected between the legacy servers and the second network. The VPN extranet gateway requests a signature certificate of each user attempting access to a legacy application to authenticate the user. The VPN extranet gateway queries the directory to confirm the user is allowed access to the legacy server after authenticating the user. The VPN extranet gateway establishes a connection between the legacy client software and the legacy application if the user is allowed access to the legacy server.

The present invention is further directed to a method for secure legacy enclaves in a PKI that includes: installing a VPN extranet gateway between one or more legacy servers and a legacy client platform; attempting access to a legacy application on a legacy server by a user employing legacy client software on the legacy client platform; requesting a signature certificate of the user by the VPN extranet gateway to authenticate the user; querying a directory by the VPN extranet gateway after authenticating the user to confirm the user is allowed access to the legacy server; and establishing a connection between the legacy client software and the legacy application if the user is allowed access to the legacy server.

The present invention is also directed to an article comprising a storage medium having instructions stored therein, where the instructions when executed cause a processing device to perform: receiving an attempt to access a legacy application on a legacy server by a user employing legacy client software; requesting a signature certificate of the user to authenticate the user; querying a directory to confirm the user is allowed access to the legacy server after authenticating the user; and establishing a connection between the legacy client software and the legacy application if the user is allowed access to the legacy server.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
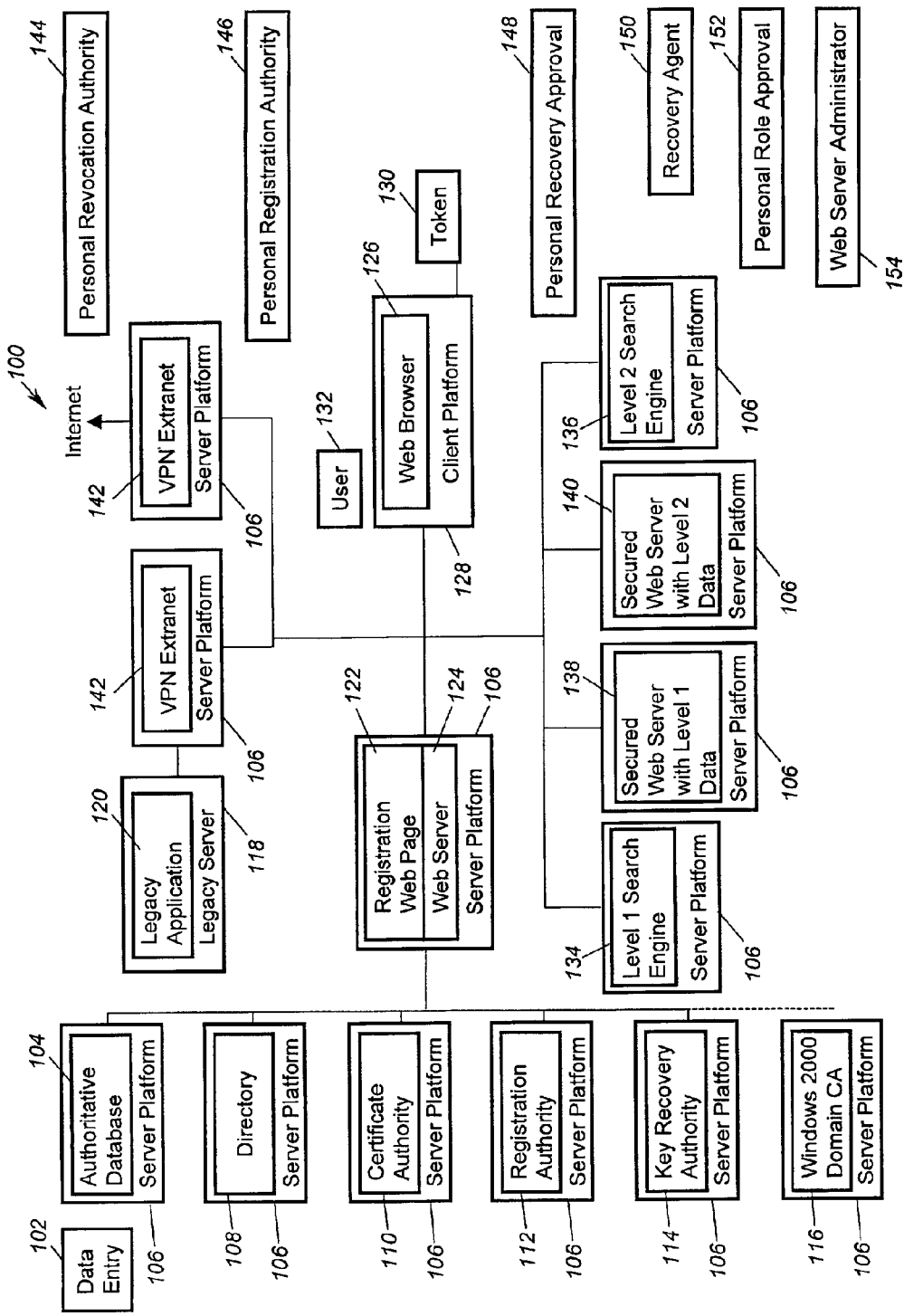
FIG. 2 is a block diagram of an exemplary system architecture in which PKI processes may be practiced according to an example embodiment of the present invention.

FIG. 2 shows a block diagram of an exemplary system architecture 100 in which Public Key Infrastructure (PKI) processes may be practiced according to an example embodiment of the present invention. The present invention is not limited to the system architecture 100 shown in FIG. 2. The boxes shown in FIG. 2 represent entities that may be hardware, software, or a combination of the two. The entities are operably connected together on a network. Entities not shown as being connected to the network represent one or more human beings that perform the function denoted inside the box.

System architecture 100 includes Data Entry 102 which performs a data entry function for Authoritative Database 104. Authoritative Database 104 is resident on server platform 106. A server platform 106 is referred to in this description but it should be understood that the present invention is not limited to any particular server architecture. Server platform 106 may be, for example, UNIX or Windows NT servers.

Authoritative database 104 contains information about members of the group or enterprise (e.g., company) for which PKI services in accordance with the present invention may be performed. The present invention is not limited by the structure of the group or enterprise for which information is stored in the authoritative database 104. The information contained in Authoritative database 104 may include, for example, the name, address, telephone numbers, manager's name, employee identification, etc., of the members of the group or enterprise. Directory 108 contains the same information contained in database 104, but is optimized for fast look-up of the information stored therein rather than fast data entry. The information contained in Directory 108 may be accessed faster than accessing the information from database 104. Directory 108 functions similar to an on-line quickly accessible phone book, containing reference information about the members of the group or enterprise stored in authoritative database 104.

Certificate authority 110 may be conventional off-the shelf software executed on server platform 106. Certificate authority 110 provides storage of certificates and related information. This will be described in more detail hereinafter. Registration authority 112 may also be off-the shelf software executable on server platform 106. Registration authority 112 will also be described in more detail hereinafter. Key recovery authority 114 may also be off-the shelf server software executable on Server Platform 106, and may provide the function of recovering keys (e.g., archived or lost keys) for members of the group or enterprise.

A Windows 2000 Domain Certificate Authority (CA) 116 is shown with a dotted line connection to the network and may or may not be part of a system according to the present invention. Windows 2000 is able to use PKI certificates for network single sign-on, but Windows 2000 is designed to use only the Windows Certificate Authority Windows. Therefore, a system according to the present invention may include a conventional Certificate Authority 110 as well as a 2000 Domain CA 116.

Legacy server 118 executes legacy application programs 120. Legacy server 118 may be, without limitation, a main frame, mini-computer, workstation or other server capable of hosting legacy software applications. Legacy software applications generally may not be designed to be inherently interoperable with a PKI. Legacy applications 120 may be accessible on the client side by a custom client 128 such as an emulator or custom database Graphic User Interface (GUI). Examples of emulators are terminal emulators of an IBM 3270 or terminal emulators of a vt100.

Figure 1:
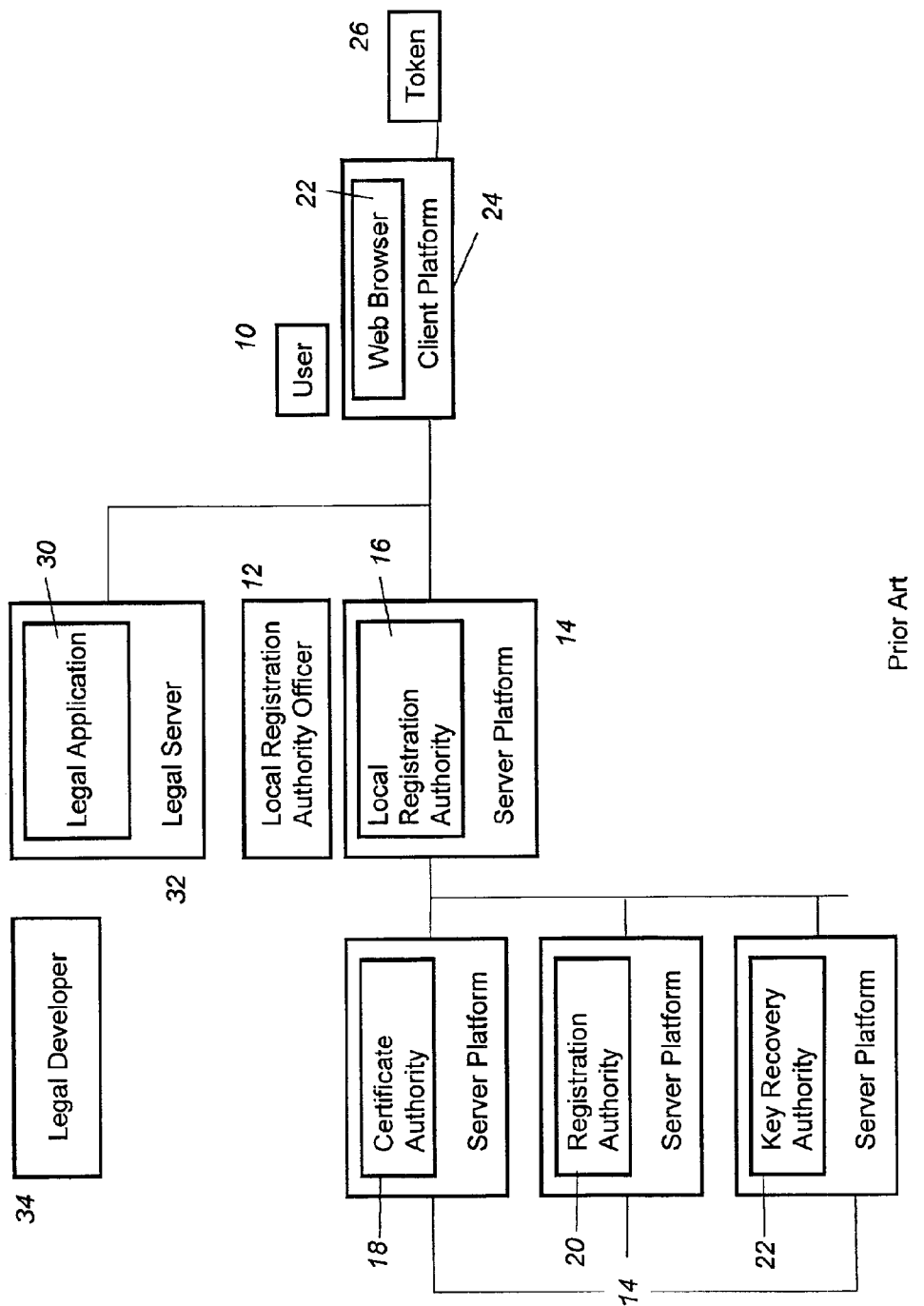
FIG. 1 is a block diagram of an example PKI system architecture.

Registration web page 122, which may be one or more pages, functions as the user interface to system architecture 100 shown in FIG. 1. Web Server 124 is a software application that serves Web Pages (such as web page 122) or other HTML outputs to a web browser client (such as web browser 126). Web Server 124 may be any software application that serves Web Pages or HTML outputs such as, for example, Apache, Microsoft Internet Information Server application, etc.

Web browser 126 is resident on client platform 128 which may be any user computer or computing device. Web browser 126 may be a client software application for browsing web pages such as, for example, HTML protocols, XML protocols, or other protocols. Web browser 126 may be programmed to operate with PKI certificates issued by certificate authority 110. Examples of web browsers which have this capability include Netscape Navigator and Microsoft Internet Explorer. The token 130 may be a smart card, a device with a Universal Serial Bus (USB), or other hardware token device capable of generating, storing, and/or using PKI certificates.

A user 132 is a person that uses or desires access to system architecture 100. User 132 may transition through a number of states which include, for example, a new user, a current user, and a former user. A former user is no longer a member of the group or enterprise. System architecture 100 is described with reference to two levels of security with each level corresponding to a different security requirement. The number of the levels of security is not a imitation of the present invention. The level 1 search engine 134 may be a search engine that is permitted to search system architecture 100, but is allowed access to only level 1 data which is the lowest level of security. Level 1 data may be, for example, data which is freely distributable whereas level 2 data may be considered to be proprietary. A Level 2 search engine 136 may be a search engine which is allowed to search both level 1 and level 2 data. A Level N search engine (not illustrated) may be a search engine which is allowed to search through servers possessing Levels 1 through N data.

A secured level server with Level 1 data may be a web server containing only level 1 data that is secured so that users may need to have level 1 access (at least) to access the level 1 servers. A secured web server with level 1 data 140 may be a web server that contains level 2 data that has been secured so that users must have at least level 2 access to access the level 2 servers. A user with level 2 access may have access to both level 1 and level 2 servers. A secured web server with level N data (not illustrated) is a web server that contains level N data which is accessible by users with level N or above. Users with level N or above access may have access to all levels of data up through level N data.

VPN Extranet 142 may be a software application which functions as a network gateway, which as illustrated, may be either to legacy server 118 and legacy application 120 or to an external network such as the Internet. Personal revocation authority 144 may be one or more people that are in charge of revocation of members from system network 100. Personal registration authority 146 may be one or more people that are in charge of registration of members in system network 100. Personal recovery approval 148 may be one or more people that are in charge of obtaining recovery of certificates. A Recovery Agent 150 may be one or more people that perform recovery of certificates and may only recover a certificate if the certificate has first been designated as recoverable by another person. Personal role approval 152 may be one or more people that approve different role functions within the system network 100. A web server administrator may be one or more people that are in charge of various web functions in system network 100.

Systems and methods for secure legacy enclaves according to the present invention provide the combined application of digital signature certificates and virtual private networks (VPNs) to provide a lower cost solution to creating secure legacy enclaves. A legacy enclave may be defined as a network local area network (LAN) that has been segregated from the enterprise network for the purpose of isolating legacy servers and applications. According to the present invention, legacy enclaves are isolated from the main network. The legacy enclaves are attached to and protected by VPNs that require digital signature validation and verification from users before allowing access to the servers and applications of the legacy enclaves.

A VPN extranet gateway accesses one or more directories, that contain digital signatures of users, for validation of a user/client attempting to access a legacy system. The VPN gateway effectively creates a secure enclave around the legacy system by placing it in a virtual network consisting only of itself (i.e., the secure legacy enclave). The VPN gateway allows encrypted access through the VPN gateway, thus, employing modern security solutions for network-to-network (enterprise network-to-secure legacy enclave) activity.

Figure 3:
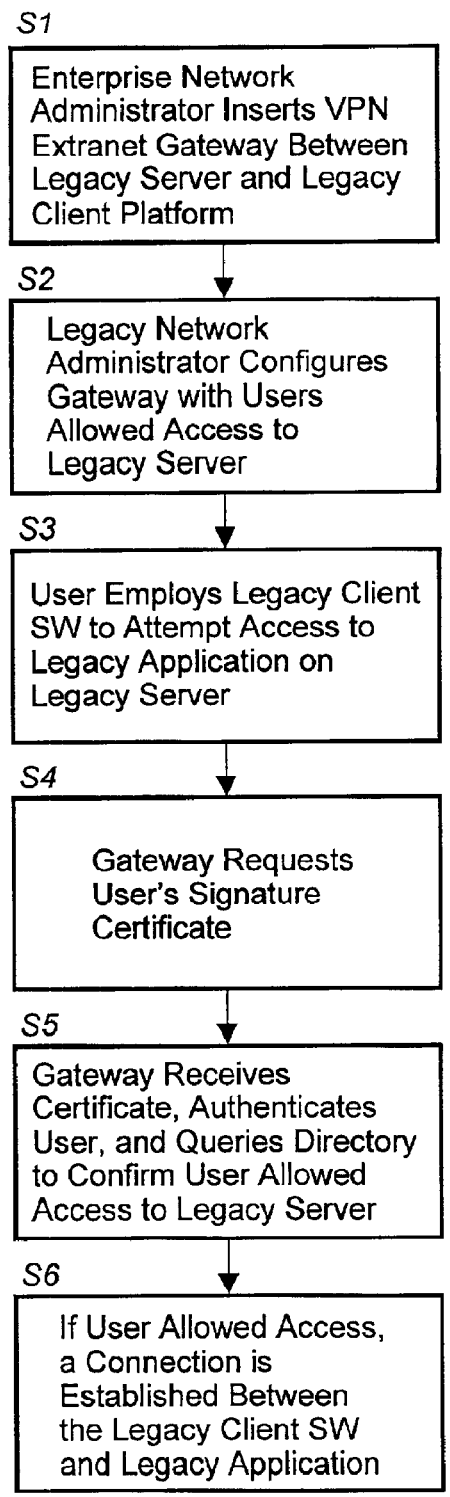
FIG. 3 is a flowchart of an example process for secure legacy enclaves in a public key infrastructure according to an example embodiment of the present invention.

FIG. 3 shows a flowchart of an example process for secure legacy enclaves according to an example embodiment of the present invention. A VPN extranet gateway is inserted between one or more legacy servers and one or more legacy client platforms S1. The legacy servers may be part of one or more legacy enclave networks. The client platforms may be connected to an enterprise network. The VPN extranet gateway may be inserted by an enterprise network administrator. The legacy network administrator may configure the VPN extranet gateway with users that are allowed to access the legacy servers S2. A user employs legacy client software, resident at a client platform, to attempt access to a legacy application on a legacy server S3. The VPN extranet gateway receives the attempt from the user and requests that the user send the user's signature certificate S4. The VPN extranet gateway uses the user's signature certificate to authenticate the user, i.e., validate that the user is indeed who the user says they are. The VPN gateway receives the user's signature certificate, authenticates the user, and queries a directory to confirm the user is allowed access to the legacy server S5. The directory may be a database that may be connected to the enterprise network. The directory contains information on all users that are members of the enterprise, along with other information about each user, for example, whether the user is allowed access to legacy servers. The directory accesses the user's information stored in the directory, and determines if the user is allowed access to the legacy server. If the user is allowed access to the legacy server, the VPN extranet gateway establishes a connection between the legacy client software resident on the client platform, and the legacy application resident on a legacy server S6. After the connection is established between the legacy client software and the legacy application, the legacy application may further require a user ID and password from the user before allowing the user access to the legacy application.

Systems and methods for secure legacy enclaves according to the present invention are advantageous in that no software changes to the legacy systems are required. Further, greater security is achieved by the requirement that someone who seeks access to the legacy system may have to provide not only a password, but also a digital signature certificate to a VPN.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes maybe made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A system for a secure legacy enclave in a Public Key Infrastructure (PKI) comprising:

at least one legacy server, the at least one legacy server containing at least one legacy application;

at least one client platform operatively connected to a network, the at least one client platform containing legacy client software employable by at least one user to access the at one legacy application;

a directory operably connected to the network, the directory containing information on the at least one user, the directory further containing information on each at least one user designating whether each at least one user is authorized to access the at least one legacy server; and a Virtual Private Network (VPN) extranet gateway, the VPN extranet gateway operatively connected between the at least one legacy server and the network, the VPN extranet gateway requesting a signature certificate of the at least one user attempting access to the legacy application to authenticate the at least one user, the VPN extranet gateway querying the directory to confirm the at least one user is allowed access to the legacy server after authenticating the at least one user, the VPN extranet gateway establishing a connection between the legacy client software and the legacy application if the at least one user is allowed access to the legacy server.

2. The system according to claim 1, wherein the directory comprises a database.

3. A system for a secure legacy enclave in a Public Key Infrastructure (PKI) comprising:

at least one legacy server, the at least one legacy server containing at least one legacy application;

at least one client platform operatively connected to a network, the at least one client platform containing legacy client software employable by at least one user to access the at one legacy application;

a directory operably connected to the network, the directory containing information on the at least one user, the directory further containing information on each at least one user designating whether each at least one user is authorized to access the at least one legacy server;

a Virtual Private Network (VPN) extranet gateway, the VPN extranet gateway operatively connected between the at least one legacy server and the network, the VPN extranet gateway requesting a signature certificate of the at least one user attempting access to the legacy application to authenticate the at least one user, the VPN extranet gateway querying the directory to confirm the at least one user is allowed access to the legacy server after authenticating the at least one user, the VPN extranet gateway establishing a connection between the legacy client software and the legacy application if the at least one user is allowed access to the legacy server; and a second network, the at least one legacy server operatively connected to the second network, the VPN extranet gateway operatively connected between the second network and the network.

4. A method for secure legacy enclaves in a Public Key Infrastructure (PKI) comprising:

installing a virtual private network (VPN) extranet gateway between at least one legacy server and a legacy client platform;

attempting access to a legacy application on the at least one legacy server by a user employing legacy client software on the legacy client platform;

requesting a signature certificate of the user by the VPN extranet gateway to authenticate the user;

querying a directory by the VPN extranet gateway after authenticating the user to confirm the user is allowed access to the at least one legacy server; and establishing a connection between the legacy client software and the legacy application if the user is allowed access to the at least one legacy server.

5. The method according to claim 4, further comprising configuring the VPN extranet gateway with users allowed access to the at least one legacy server after the installing the VPN extranet gateway between the at least one legacy server and the legacy client platform.

6. The method according to claim 4, wherein the directory comprises a database.

7. The method according to claim 4, further comprising requesting a user ID and password from the user by the legacy server after the connection is established between the legacy client software and the legacy application.

8. The method according to claim 4, further comprising requesting a user ID and password from the user by the VPN extranet gateway before the connection is established between the legacy client software and the legacy application.

9. An article comprising a storage medium having instructions stored therein, the instructions when executed causing a processing device to perform:

receiving an attempt to access a legacy application on a legacy server by a user employing legacy client software;

requesting a signature certificate of the user to authenticate the user;

querying a directory to confirm the user is allowed access to the legacy server after authenticating the user; and establishing a connection between the legacy client software and the legacy application if the user is allowed access to the legacy server.

10. The article according to claim 9, further comprising requesting a user ID and password from the user before the connection is established between the legacy client software and the legacy application.

11. The article according to claim 9, receiving configuration information regarding users allowed access to the at least one legacy server.

* * * * *